United States Patent Office 3,462,494
Patented Aug. 19, 1969

3,462,494
HYDROCARBON OXIDATION
William D. Blackley, Wappingers Falls, N.Y., assignor to Texaco Inc., New York, N.Y., a corporation of Delaware
No Drawing. Filed Nov. 21, 1966, Ser. No. 595,592
Int. Cl. C07c *49/30, 29/00, 27/12*
U.S. Cl. 260—586                         5 Claims

ABSTRACT OF THE DISCLOSURE

Method of preparing hydrocarbon oxidate comprising contacting alkane or cycloalkane of from 1 to 30 carbons with an oxygen containing gas in the presence of a paramagnetic nitroxide of the formula:

$$(R)_2NO\cdot$$

where R is perfluoroalkyl, perchloroalkyl and perfluorochloroalkyl of from 1 to 20 carbons.

---

This invention comprises a method of converting alkanes and cycloalkanes of from 1 to 30 carbons into oxygenated derivatives utilizing an oxygen containing gas and an oxidation initiating amount of paramagnetic bis(perhaloalkyl)nitroxide.

Alkanes and cycloalkanes do not readily oxidize at temperatures below about 100° C. when contacted with an oxygen containing gas, and therefore, oxidation initiators (promoters) are employed. Examples of such oxidation initiators utilized in the past are chlorine and bromine. Although these prior oxidation initiators are satisfactory, they do have the disadvantage of requiring the presence of co-initiating means such as ultraviolet light, heat, or peroxides.

I have discovered, and this constitutes my invention, a method of oxidizing the defined hydrocarbons with an oxygen containing gas at low temperature utilizing a novel oxidation initiator which does not require a co-initiating means.

More particularly, the method of the invention comprises contacting a hydrocarbon of from 1 to 30 carbons selected from the group consisting of alkane and cycloalkane with an oxygen containing gas at a temperature between about 0 and 100° C., preferably between about 52 and 50° C., in the presence of an oxidation initiating amount of a paramagnetic disubstituted nitroxide of the formula $(R)_2NO\cdot$ where R is a perhaloalkyl of from 1 to 20 carbons wherein said halo group is a member selected from the group consisting of fluorine, chlorine and mixtures thereof. The reaction is advantageously conducted utilizing a mole ratio of hydrocarbon to oxygen of between about 1:1 and 1:100, preferably between about 1:1 and 1:10. Advantageously, the amount of nitroxide oxidation initiator employed is at least about 1 mole percent and up to about 50 mole percent, preferably between 1 and 25 mole percent, based on the hydrocarbon reactant.

The oxygenated product is normally composed of one or more oxidate compounds such as alcohol, ketone, aldehyde, hydroperoxide, peroxide and/or carboxylic acid. The particular oxygenated derivatives predominating will depend in part on the hydrocarbon reactant, hydrocarbon oxidation temperature, the particular nitroxide initiator and the relative quantities of reactants and initiator. For example, when bis(trifluoromethyl)nitroxide is the initiator and dodecane is the hydrocarbon, a mixture of dodecanol and dodecanone are the principal oxidation products. However, under similar conditions when methylcyclohexane is substituted for dodecanone the oxidation products are principally methylcyclohexyl peroxide and methylcyclohexyl hydroperoxide.

If the hydrocarbon reactant and/or nitroxide initiator are solids under the reaction conditions, inert liquid diluent solvent therefor such as carbon tetrachloride and acetic acid may be employed. The diluent solvent when utilized is normally utilized in amounts of between about 50 and 99 wt. percent based on the reaction mixture.

The method of the invention is further illustrated by the following theoretical equations utilizing bis(trifluoromethyl)nitroxide, cyclohexane and oxygen as the initiator and reactant:

A. $2(CF_3)_2NO\cdot + 2C_6H_{12} + 2O_2 \longrightarrow$

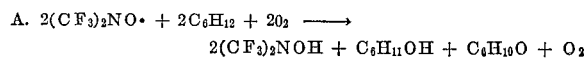
$2(CF_3)_2NOH + C_6H_{11}OH + C_6H_{10}O + O_2$

B.

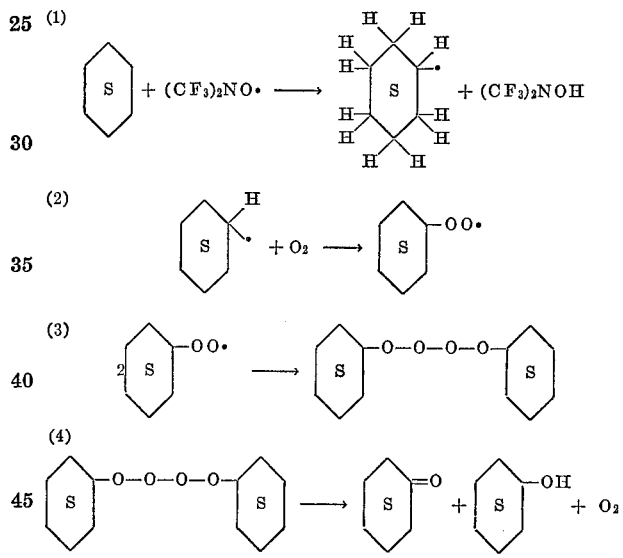

In the above equations Equation A is the overall equation and Equation B is a schematic representation of a theorized route by which cyclohexane is converted into cyclohexanone and cyclohexanol. The foregoing demonstrates the apparent function of the paramagnetic nitroxide is to convert the hydrocarbon reactant into a reactive hydrocarbon radical which is in turn highly receptive to oxidation and further reaction for eventual conversion into oxidation products.

Examples of the hydrocarbon reactants contemplated herein and their corresponding oxygenated derivatives are cyclohexane with corresponding oxygenated derivatives of cyclohexanol and cyclohexanone, dodecane with corresponding oxygenated derivatives of dodecanol and dodecanone, methylcyclohexane with corresponding oxygenated derivatives of methylcyclohexyl hydroperoxide and methylcyclohexyl peroxide, and heptane with heptanone and heptanol as corresponding oxygenated derivatives. Further examples are set forth as follows in Table I:

TABLE I

| Reactant | Oxygenated Derivative |
|---|---|
| 1. 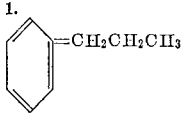 | 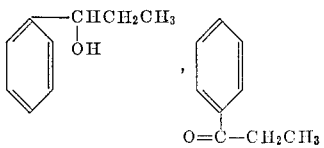 |
| 2.  | 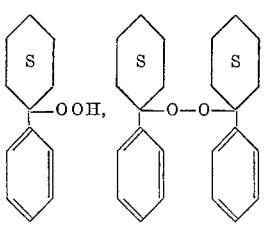 |

Examples of the paramagnetic nitroxide oxidation initiator contemplated herein are bis(trifluoromethyl) nitroxide, bis(trichloromethyl)nitroxide, bis(2- chloro-1, 1,2,2 - tetrafluoroethyl)nitroxide, bis(perfluoroheptyl) nitroxide.

The paramagnetic nitroxide initiator is prepared in the manner set forth in U.S. 3,200,158.

Examples of the oxygen containing gas are pure oxygen, air and oxygen diluted with inert gas such as nitrogen, argon and mixtures thereof.

The following examples further illustrate the invention but are not to be construed as limitations thereof.

Example I

To a 50 cc. Pyrex flask fitted with a stirrer, gas inlet and gas outlet tube connected to a cold trap, there was charged 8.9 grams (0.11 mole) of cyclohexane. A mixture of oxygen and bis(trifluoromethyl)nitroxide of the formula $(CF_3)_2NO\cdot$ was bubbled into the cyclohexane with vigorous stirring at 25° C. for a period of 2½ hours. The total amount of bis(trifluoromethyl)nitroxide and oxygen introduced into the reaction system was 2 grams (.0119 mole) $(CF_3)_2NO\cdot$ and 5.4 grams (0.17 mole) $O_2$. The final reactor contents were analyzed and determined to contain .0046 mole of cyclohexanone and .0054 mole of cyclohexanol. The analysis comprised infrared, gas chromatographic and nuclear magnetic reasonance spectroscopy plus a confirmation from the melting point of the 2,4-dinitrophenylhydrazone derivative of the cyclohexanone.

Example II

To a 25 cc. Teflon ampoule there was charged 1.13 millimoles of bis(trifluoromethyl)nitroxide, 4.53 millimoles cyclohexane and 4.35 millimoles oxygen. The ampoule was sealed and warmed to 32° C. for a period of 1.5 hours. Gas chromatography and infrared analysis confirmed the presence of cyclohexanol and cyclohexanone. Further, the 2,4-dinitrophenylhydrazone derivative of the ketone in the reaction mixture gave a derivative melting point of 158° C. and the literature value for the cyclohexanone derivative of 2,4-dinitrophenylhydrazone is 162° C.

Example III

To a 25 cc. Pyrex ampoule there was charged 2.6 grams (30 millimoles) of n-dodecane, 0.47 gram (0.28 millimole) of bis(trifluoromethyl)nitroxide and the ampoule was pressured with oxygen to a pressure of 700 mm. Hg. The ampoule was sealed and shaken vigorously at 25° C. for 15 minutes. Infrared and gas chromatographic analysis of the final product indicated the presence of dodecanone and dodecanol in combined yield of 0.27 millimole basis gas chromatographic analysis.

Example IV

To a 50 cc. Pyrex flask fitted with a stirrer, gas inlet tube and gas outlet tube connected to a cooled trap, there was introduced 46 grams (0.5 mole) of methylcyclohexane. A mixture of bis(trifluoromethyl)nitroxide and oxygen was bubbled through the methylcyclohexane at 25° C. for a period of 2.5 hours utilizing a total amount of 9.28 millimole $(CF_3)_2NO\cdot$ and 90 millimoles $O_2$. The liquid reaction product remaining in the flask was analyzed and determined to contain 16.3 millimoles methylcyclohexyl hydroperoxide of the formula:

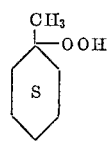

and 7.3 millimoles methylcyclohexyl peroxide:

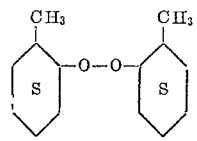

Analysis was based on infrared, gas chromatography, nuclear magnetic resonance and iodometric titration.

I claim:
1. A method of preparing a hydrocarbon oxidate comprising contacting at a temperature between about 0 and 100° C. a hydrocarbon selected from the group consisting of alkanes and cycloalkanes of from 1 to 30 carbons with an oxygen containing gas selected from the group consisting of air, oxygen, and oxygen diluted with inert gas in the presence of an oxidation initiating amount of a paramagnetic disubstituted nitroxide of the formula:

$$(R)_2NO\cdot$$

where R is selected from the group consisting of perfluoroalkyl, perchloroalkyl and perfluorochloroalkyl of from 1 to 20 carbons.

2. A method in accordance with claim 1 wherein said contacting is conducted utilizing a mole ratio of said hydrocarbon reactant to said oxygen of between about 1:1 and 1:100 in the presence of between about 1 and 50 mole percent of said oxidation initiator based on said hydrocarbon.

3. A method in accordance with claim 2 wherein said hydrocarbon reactant is cyclohexane, said oxidation initiator is bis(trifluoromethyl)nitroxide of the formula $(CF_3)_2NO\cdot$ and said oxygenated derivative is a mixture of cyclohexanone and cyclohexanol.

4. A method in accordance with claim 2 wherein said hydrocarbon is n-dodecane, said oxidation initiator is bis(trifluoromethyl)nitroxide of the formula $(CF_3)_2NO\cdot$ and said oxygenated derivative is a mixture of dodecanol and dodecanone.

5. A method in accordance with claim 2 wherein said hydrocarbon is methylcyclohexane, said oxidation initiator is bis(trifluoromethyl)nitroxide and said oxygenated derivative is a mixture of methylcyclohexyl hydroperoxide of the formula:
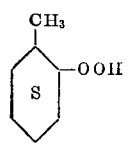
and dimethylcyclohexyl peroxide of the formula:
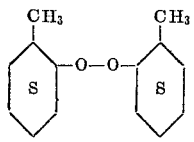
References Cited
UNITED STATES PATENTS
2,451,869  10/1948  Repean et al. _____ 260—610
FOREIGN PATENTS
700,546  2/1952  Great Britain.
BERNARD HELFIN, Primary Examiner
W. B. LONE, Assistant Examiner
U.S. Cl. X.R.
260—514, 533, 576, 592, 597, 604, 610, 617, 631, 632